W. GUYTON.
EQUALIZING DEVICE.
APPLICATION FILED DEC. 29, 1910.
991,977.
Patented May 9, 1911.
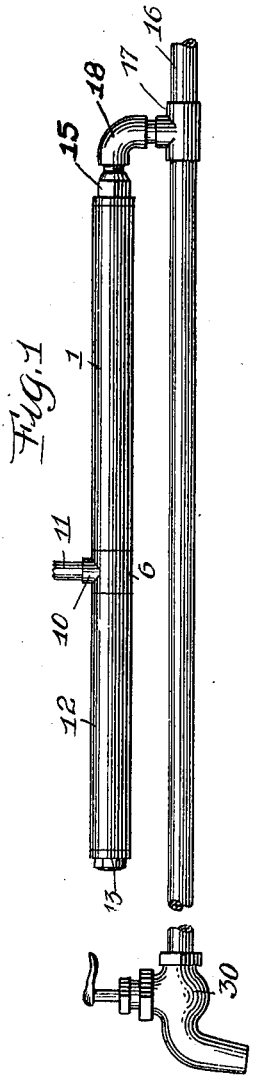
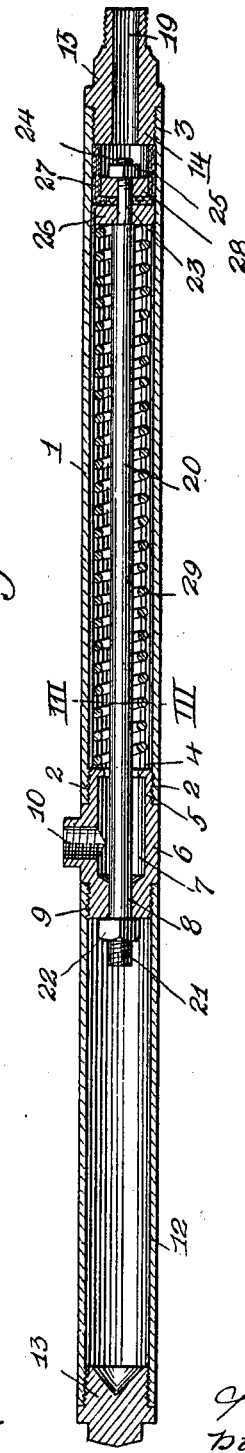
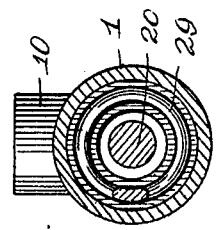
WITNESSES
INVENTOR
William Guyton,
by Attorneys.

UNITED STATES PATENT OFFICE.

WILLIAM GUYTON, OF AVALON, PENNSYLVANIA, ASSIGNOR OF ONE-HALF TO ROBERT STINSON, OF PITTSBURG, PENNSYLVANIA.

EQUALIZING DEVICE.

991,977.  Specification of Letters Patent.   Patented May 9, 1911.

Application filed December 29, 1910. Serial No. 599,836.

*To all whom it may concern:*

Be it known that I, WILLIAM GUYTON, a citizen of the United States of America, residing at Avalon, in the county of Allegheny and State of Pennsylvania, have invented certain new and useful Improvements in Equalizing Devices, of which the following is a specification, reference being had therein to the accompanying drawing.

This invention relates to an equalizing device, and the primary object of the invention is to provide positive and reliable means for absorbing or compensating for the back pressure of a water main or pipe, thereby eliminating all danger of pipes bursting, leaking or injury to pumping engines due to ruptures or strains incurred by back pressure.

Another object of the invention is to provide a device of the above type that is simple in construction, durable, easy to install and highly efficient for the purposes for which it is intended.

These and such other objects as may hereinafter appear are attained by the novel construction, combination and arrangement of parts to be presently described in detail and then claimed.

Reference will now be had to the drawing, wherein:—

Figure 1 is a side elevation of the device as applied to a water pipe, Fig. 2 is an enlarged longitudinal sectional view of the device, and Fig. 3 is a cross sectional view of the device taken on the line III—III of Fig. 2.

The reference numeral 1 denotes a tube having the ends thereof interiorly screw threaded, as at 2 and 3 and said tube adjacent to the threads 2 is provided with an inwardly projecting annular flange 4. Screwed in the end of the tube 1 and engaging the threads 2 and the flange 4 is the exteriorly threaded end 5 of a guide and air outlet member 6, said member having a longitudinal bore 7 with the end thereof reduced in the exteriorly threaded end 9 of said member. The member 6 has an air outlet port 10 and a pipe 11 can be connected to said port to convey air to the surface of the ground should the device be embedded in the earth. Screwed upon the exteriorly threaded end 9 of the member 6 is a tubular casing 12 having the outer end thereof provided with a plug 13. Screwed in the end of the tube 1 to engage the threads 3 thereof is the exteriorly threaded end 14 of a nipple 15 to which a water supply pipe or main 16 can be connected through the medium of a tee 17 and an elbow 18. The nipple 14 has a longitudinal bore 19 in communication with the tube 1. Slidably mounted in the end 9 of the member 6 is a piston rod 20 having the rear end thereof threaded, as at 21 and provided with a nut 22. The forward end of the piston rod 20 is reduced, as at 23, threaded, as at 24 and provided with a nut 25. Mounted upon the reduced end 23 of the piston rod is a piston head 26 having a resilient packing or sleeve 27 surrounding the reduced end 23 of said head, the packing being preferably made of leather, and retained upon the reduced end of the piston rod by a washer 28 interposed between the packing and the nut 25.

Encircling the piston rod 20 within the tube 1 is a coiled compression spring 29 having one convolution thereof bearing against the annular flange 4 of the tube and the other end convolution against the head 26. The flange 4 is provided so that the member 6 can be easily connected to the tube 1 without interfering with the spring, thereby relieving the tension of the spring 29 upon the threads holding the member 6 in the tube 1.

The device can be connected to a water main or water supply pipe, as shown in Fig. 1 and in order that the operation of the device can be fully understood, I will assume that the water supply pipe 16 has been supplying water and that the supply has been shut off by the faucet 30 of said pipe. The closing of the faucet 30 of said pipe causes a back pressure in the pipe 16, and this back pressure, figuratively speaking, is adapted to pass through the nipple 14 and impinge the piston head 26, forcing said head rearwardly and placing the spring 29 under tension. The tubular casing 12 provides clearance for the rear end of the piston rod and the member 6 allows air to escape during a rearward movement of the piston head. Immediately upon the pressure becoming equalized, the coiled compression spring 29 gradually restores the piston head 26 to its normal position.

What I claim is:—

1. In an equalizing device, the combination with a water supply pipe or main, of a nipple in communication with said pipe, a tube carried by said nipple, an air outlet member connected to said tube, a casing carried by said member, a piston rod slidably mounted in said member, a piston head carried by said rod, and means interposed between said piston head and said member and adapted to normally retain said piston head in engagement with said nipple.

2. An equalizing device embodying a tube, a nipple carried by one end thereof, an air outlet member carried by the opposite end of said tube, a piston rod slidably mounted in said member, a piston head carried by said rod within said tube, a coiled compression spring encircling said rod and adapted to normally retain said head in engagement with said nipple, and a casing carried by said member and adapted to inclose the end of said piston rod.

In testimony whereof I affix my signature in the presence of two witnesses.

WILLIAM GUYTON.

Witnesses:
ROBERT STINSON,
MAX H. SROLOVITZ.

Copies of this patent may be obtained for five cents each, by addressing the "Commissioner of Patents, Washington, D. C."